United States Patent [19]

Vion

[11] Patent Number: 5,047,149

[45] Date of Patent: Sep. 10, 1991

[54] APPARATUS FOR THE CLARIFICATION OF LIQUIDS, SUCH AS NOTABLY WATER, FRUIT JUICES, GRAPE MUST OR SIMILAR

[75] Inventor: Patrick Vion, Houilles, France

[73] Assignee: Degremont, Rueil-Malmaison, France

[21] Appl. No.: 531,445

[22] Filed: May 31, 1990

[30] Foreign Application Priority Data

Jun. 1, 1989 [FR] France ............................... 89 07259

[51] Int. Cl.⁵ .............................................. B03D 1/14
[52] U.S. Cl. .................................... 210/513; 210/523; 210/525; 210/521; 210/262; 210/221.1; 210/703; 210/94; 210/127
[58] Field of Search ...................... 210/703, 262, 221.1, 210/262, 513, 703, 248; 127/57

[56] References Cited

U.S. PATENT DOCUMENTS 3,501,000  3/1970  Roberts, Jr. .
4,216,085  8/1980  Chittenden ........................... 210/703
4,743,379  5/1988  Sugihara et al. .

Primary Examiner—Robert A. Dawson
Assistant Examiner—Abeer I. Daoud
Attorney, Agent, or Firm—Pollock, VandeSande & Priddy

[57] ABSTRACT

An apparatus for the clarification of liquids, such as notably water, fruit juices, musts such as grape musts, including an enclosure in which is brought the liquid to be clarified after a pretreatment operation, such as screening, as well as a flotation equipment, fed by a transfer pump with liquid pressurized and relieved of the pressure prior to its introducting in the flotation equipment, from which the clarified liquid is introduced in a filtration system. The apparatus includes the features that the flotation equipment is placed above the assembly used for the pretreatment of the liquid so as to obtain a sufficient load for bringing about a hydraulic balance of the various constituents of the apparatus, in order that it can operate with a small load available upstream and allow a possible recycling, by simple gravity, of the floating particles collected at the surface of the flotation equipment to any point of the pretreatment.

6 Claims, 1 Drawing Sheet

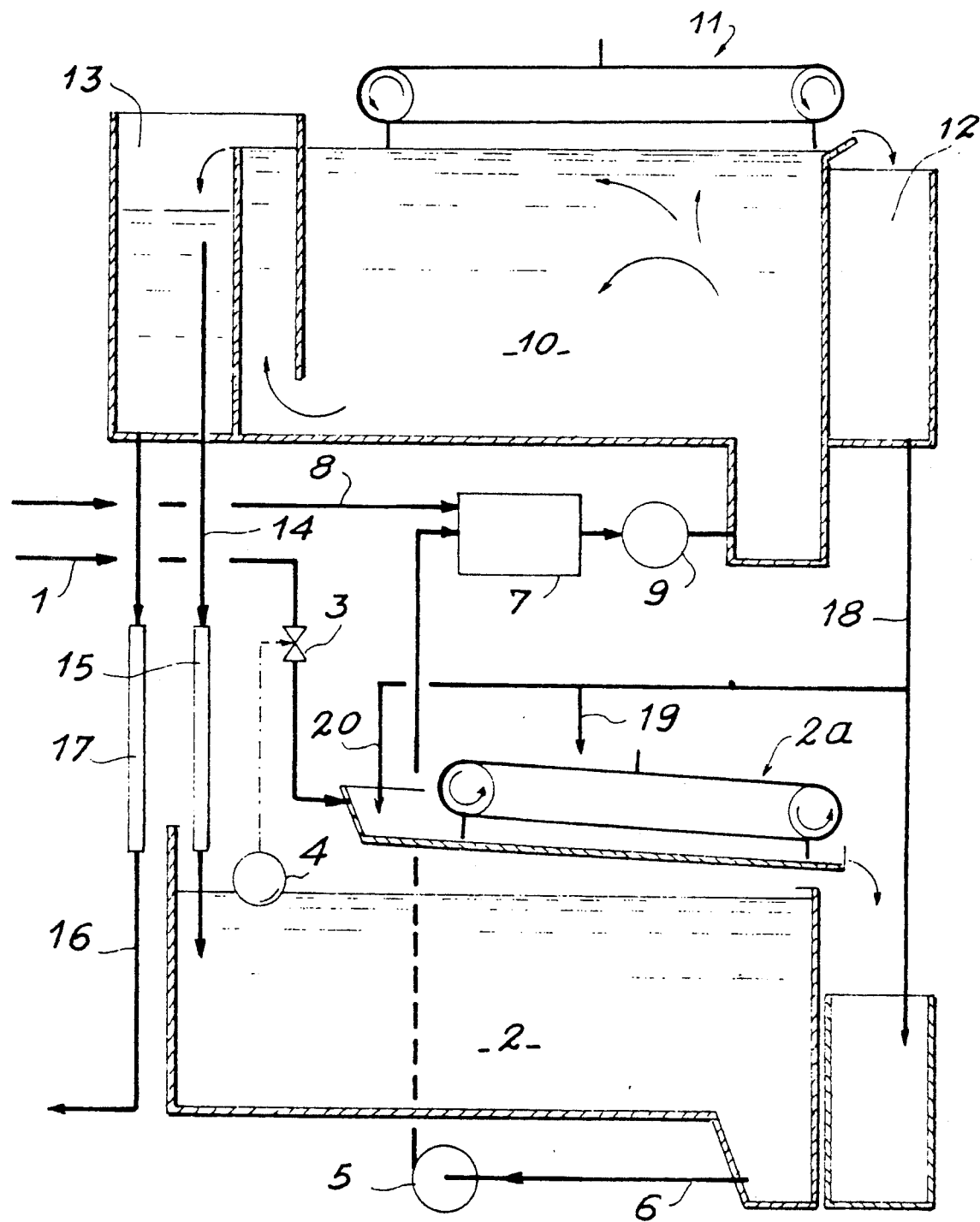

APPARATUS FOR THE CLARIFICATION OF LIQUIDS, SUCH AS NOTABLY WATER, FRUIT JUICES, GRAPE MUST OR SIMILAR

FIELD OF THE INVENTION

The invention relates to an apparatus for the clarification of liquids, such as notably water, fruit juices and grape must.

SUMMARY AND OBJECTS OF THE INVENTION

The aim of the invention is to provide a compact apparatus wherein hydraulic balance between the various components of the apparatus is ensured by a minimum control and regulation, whatever the output variations.

According to the invention, this goal is reached by placing the flotation equipment above the assembly used for the pretreatment of the liquid to be clarified so as to obtain a sufficient load for bringing about the balance of the various components of the apparatus, in order that it can operate with a small load available upstream and also allow a possible recycling of the floating particles collected at the surface of the flotation equipment to the pretreatment apparatus.

According to a feature of the invention, a pressurizing pump necessary for the flotation is used for transferring the liquid to the flotation equipment.

According to another feature of the invention, the feeding of the apparatus with the liquid to be treated is regulated by a means such as a float valve for maintaining the level reached by the liquid in the lower enclosure of the apparatus at a constant value.

Finally and with a view to adapt the output of the apparatus to the requirements of the system situated downstream of the latter, an overflow is placed in the compartment of the flotation equipment containing the clarified liquid, which returns the load in excess to the lower inclosure, this return causing the level in said enclosure to rise and partially close the float valve.

Due to the arrangements adopted according to the invention, balance is thus provided by an equalizing the rate of feeding liquid to the apparatus and the demand rate, which can be variable downstream of the apparatus, the difference between the incoming rate and an initial setting rate being recirculated in a loop formed by the lower enclosure, the pump providing for the pressurization of the liquid with a view to flotation of solids in the flotation equipment, this difference being regulated by the presence of the overflow in the flotation equipment.

BRIEF DESCRIPTION OF THE DRAWING

With reference to the single FIGURE of the accompanying schematic drawing, there is described hereafter an embodiment of the invention, given only by way of a non limiting example.

DETAILED DESCRIPTION OF THE INVENTION

According to this embodiment, the liquid to be treated is brought, for example from a loaded vat (not shown) and via a conduit 1, to a tank 2, while first passing through a device 2a which can be a coarse screening system, a filtering grid, a thickening grid or equivalent.

According to the invention, tank 2 is placed at the base of the apparatus.

On the liquid inlet conduit 1 is mounted a valve 3 operatively controlled by a float 4, which is placed in tank 2.

In tank 2, the liquid is pumped by a pump 5 connected to conduit 6 in order to be pressurized in an enclosure 7 where it is saturated with a gas introduced by a conduit 8. The pressurized liquid is, prior to its introduction to the flotation equipment 10, relieved of pressure by an adapted member 9 so as to create within the liquid micro-bubbles which will cause clarification of the liquid by flotation of the particles contained in the liquid.

The flotation equipment 10 is provided with a surface scraper 11 discharging the particles which are separated from the liquid in a chute 12 from where they can be brought only by gravity and due to the arrangements according to the invention, via conduit 18 to different points of the apparatus, for example as shown at 19 and 20 on the thickening grid, or discharged from the apparatus.

On the opposite end of the flotation equipment, the clarified liquid is collected in a compartment 13 provided, according to the invention, with an overflow 14 discharging to tank 2 and provided with a transparent element 15 allowing one to see the flow of the liquid.

From compartment 13, the clarified liquid is brought by a conduit 16, past a window 17, to a filtration system operating with sand, a membrane for reverse osmosis, or any other appropriate device (not shown), which provides the "downstream demand", which decreases very generally with time whatever the nature of the system used.

The apparatus is put in operation and operates in the following manner:

The operator sets the rate of the liquid flowing from compartment 13 of the flotation equipment, by setting the discharge rate of the transfer pump 5 as a function of the "downstream demand", the window 17 allowing him to identify the level reached in the liquid inlet duct 16 to the downstream filtration system.

On the upstream side, the valve 3 with a float 4 allows a constant level in tank 2 to be maintained by equalizing the feeding rate to tank 2 and the discharge rate from tank 2 of the transfer pump 5.

When the demand decreases, which is the general case for all the filtration systems, the level in compartment 13 rises until it reaches the overflow 14, returning to tank 2 the difference between the discharge rate of pump 5 and that of the liquid flowing through conduit 16. In turn, valve 3 with the float 4 reaches a position such that the feeding rate is equal to the effluent output flow rate.

In an extreme case, if the demand is non existent, the discharge rate generated by pump 5 is totally recirculated without any risk of overflow or damages for the pump or the installation as such.

In practice, the user of the installation can check by means of the transparent element 15 provided in the overflow 14 the magnitude of the recycling to tank 2 and therefore the excess feed from pump 5. If he wishes so, he can then reduce the discharge rate of this pump.

The system can also operate with a "downstream demand" varying in both directions, that is increasing or decreasing, under the condition that the discharge rate of pump 5 is set on the maximum "downstream demand" rate.

Various modifications can be brought about to the embodiment described and shown, without departing from the scope of the invention.

Thus, instead of a "direct flotation" which is carried out only by means of the liquid to be treated, one can use the "indirect flotation" which brings a portion of the effluent incoming from the flotation equipment which has been pressurized and then relieved of the pressure, to intervene in order to be mixed with the raw liquid which, in this case, is introduced at the base of the flotation equipment by an extra pump.

In order to carry out a flocculation decantation on the raw liquid, it is also possible to use a flocculator instead of a simple tank.

The apparatus according to the invention is particularly adapted to the treatment of water; and in the agricultural food field, particularly to the clarification of fruit juices and of musts, such as grape musts.

I claim:

1. Apparatus for clarifying a liquid which contains suspended solids, said apparatus comprising:
   (a) tank means for containing said liquid;
   (b) inlet conduit means in fluid communication with said tank means for feeding said liquid from an external source into said tank means;
   (c) pretreatment means in fluid communication with said tank means, said pretreatment means being located at an elevation greater than that of said tank means for providing a gravity flow of liquid and suspended solids from said pretreatment means to said tank means;
   (d) flotation means for separating suspended solids from said liquid, said flotation means having clarified liquid outlet means and suspended solids outlet means, said flotation means being positioned at an elevation greater than said pretreatment means and said tank means for providing a gravity flow of suspended solids to said pretreatment means and clarified liquid to said tank means;
   (e) tank outlet conduit means for providing fluid communication between said tank means and said flotation means;
   (f) pump means for transferring liquid between said flotation means through said tank outlet conduit means;
   (g) first recycle conduit means for providing fluid communication between said clarified liquid outlet means of said flotation means and said tank means for recycling liquid; and,
   (h) second recycle conduit means for providing fluid communication between said suspended solids outlet means of said flotation means and said pretreatment means for recycling solids.

2. Apparatus according to claim 1 wherein said tank means is provided with float means and said inlet conduit means is provided with valve means in operative relationship with said float means for controlling the rate of flow of feed liquid into said tank means in response to a vertical position of said float means.

3. Apparatus according to claim 1 wherein said first recycle conduit means comprises overflow conduit means providing a substantially constant load of liquid in said flotation means.

4. Apparatus according to claim 3 wherein said overflow conduit means includes a transparent portion for monitoring the rate of recycle.

5. Apparatus according to claim 1 wherein said clarified liquid outlet means includes a transparent portion for monitoring the rate of discharge of said clarified liquid from said flotation means.

6. Apparatus according to claim 1 wherein said tank outlet conduit means includes means for saturating liquid within said conduit with a pressurized gas and means for releasing pressure on said gas for forming bubbles in said liquid for enhancing flotation of said suspended particles.

* * * * *